(12) United States Patent
Anderson (10) Patent No.: US 6,460,558 B2
(45) Date of Patent: Oct. 8, 2002

(54) PILOT STAGE OR PRESSURE CONTROL PILOT VALVE HAVING A SINGLE ARMATURE/FLAPPER

(75) Inventor: Wayne R. Anderson, Eden Prairie, MN (US)

(73) Assignee: Sauer-Danfoss, Inc., Ames, IA (US)

( * ) Notice: Subject to any disclaimer, the term of this patent is extended or adjusted under 35 U.S.C. 154(b) by 0 days.

(21) Appl. No.: 09/728,964

(22) Filed: Dec. 4, 2000

(65) Prior Publication Data
US 2002/0066480 A1 Jun. 6, 2002

(51) Int. Cl.[7] .............................................. F15B 13/044
(52) U.S. Cl. ........................ 137/14; 137/82; 137/625.61
(58) Field of Search ........................ 137/14, 82, 625.61

(56) References Cited

U.S. PATENT DOCUMENTS

| | | | | |
|---|---|---|---|---|
| 2,823,689 A | * | 2/1958 | Healy | 137/82 |
| 2,827,067 A | * | 3/1958 | Healy | 137/82 |
| 2,832,365 A | * | 4/1958 | Smith | 137/82 |
| 2,882,437 A | * | 4/1959 | McKechnie | 137/82 |
| 2,911,991 A | | 11/1959 | Pearl | |
| 2,959,191 A | * | 11/1960 | Schuman et al. | 137/625.61 |
| 3,015,343 A | * | 1/1962 | Gardiner et al. | 137/625.61 |
| 3,176,593 A | * | 4/1965 | Bernstein | 137/625.61 X |
| 3,183,918 A | | 5/1965 | Bester | |
| 3,364,822 A | * | 1/1968 | Gutkowski | 137/596.15 |
| 3,499,463 A | * | 3/1970 | Trott et al. | 137/625.61 X |
| 4,362,182 A | | 12/1982 | Sjolund | |
| 4,537,220 A | | 8/1985 | Anderson | |
| 4,576,200 A | | 3/1986 | Janecke et al. | |
| 4,621,660 A | | 11/1986 | Klocke | |
| 4,715,397 A | | 12/1987 | Stearns | |
| 4,719,942 A | * | 1/1988 | Hayner | 137/625.61 |
| 4,783,047 A | | 11/1988 | Baltus et al. | |
| 4,794,941 A | | 1/1989 | Godon | |
| 5,590,677 A | * | 1/1997 | Kuroda | 137/85 |
| 5,653,422 A | | 8/1997 | Pieloth et al. | |

* cited by examiner

Primary Examiner—Gerald A. Michalsky (57) ABSTRACT

An improved pilot stage includes a flapper having first and second ends, first and second nozzles in fluid communication with the first and second ends, and a magnetic torque motor having a first coil which is magnetically coupled to the first end of the flapper. An input current to the first coil creates a magnetic torque on the flapper, causing the flapper to pivot. The torque input from the magnetic circuit is reflected through the pivot to create a balancing differential pressure output at the nozzles proportional to the input electrical signal. The flapper does not require a torsion bar (or tube) pivot or a separate armature, as required by functionally similar pilot stages.

14 Claims, 6 Drawing Sheets

PILOT STAGE OR PRESSURE CONTROL PILOT VALVE HAVING A SINGLE ARMATURE/FLAPPER

BACKGROUND OF THE INVENTION

Electro-hydraulic pilot stages are known in the art. In a conventional arrangement, a magnetic torque motor (utilizing a magnet, a coil, a magnetic plate, and magnetic pole pieces) is used to control movement of an armature. The movement of the armature in turn produces movement in a separate flapper that is coupled to the armature.

The coupling between the armature and flapper is a torsion pivot arrangement (a torsion bar or torsion tube is often utilized in the industry). In response to the movement of the flapper, a pressure differential is created between the output of two nozzles that are positioned in close proximity to the flapper. The differential pressure balances the torque applied to the armature.

It can be appreciated that the use of a separate armature in combination with a flapper adds complexity to the pilot stage. In order to control the movement of a flapper, the movement of the armature must be controlled. This requires an understanding of the interrelationship between the flapper and the armature. In addition, the use of an armature which is a separate piece from the flapper adds to the cost of the pilot stage by requiring two distinct parts. In a similar manner, the use of a torsion pivot also adds to the cost of the valve. There is a need in the art for an electro-hydraulic pilot stage which does not require a torsion pivot or an armature which is separate from the flapper.

Therefore, it is a primary object of the present invention to provide an improved electro-hydraulic pilot stage.

It is a further object of the present invention to provide an electro-hydraulic pilot stage that utilizes a single flapper to perform the same function that has previously been performed by a flapper in conjunction with a separate armature.

A further object of the invention is to provide a pilot stage which eliminates the need for a torsion pivot (plate or tube).

An additional object of the present invention is to provide an electro-hydraulic pilot stage of greater reliability and consistency.

An additional object of the present invention is to provide differential pressure proportional to input current without utilizing a permanent magnet.

A still further object of the present invention is to provide an electro-hydraulic pilot stage which is economical to manufacture, durable in use, and efficient in operation.

These, as well as other objects and features of the present invention, will be apparent from the following detailed description and claims in conjunction with the accompanying drawings.

SUMMARY OF THE INVENTION

The present invention includes an improved pilot stage. The pilot stage has first and second nozzles which are connectable to a fluid supply. The pilot stage also has a flapper having first and second ends. The ends of the flapper are in fluid communication with the nozzles. The pilot stage additionally includes a magnetic torque motor having a coil that is connectable to an electrical energy source. The coil is magnetically coupled to the first end of the flapper. When an input current is supplied to the coil, the flapper will pivot. The pivotal movement of the flapper brings one end of the flapper closer to one of the nozzles, creating a pressure differential between the nozzles. A second coil can be provided so that the flapper can be pivoted in two directions, thereby obtaining a differential pressure in both directions, proportional to the input current.

The pressure differential acts on the flapper, counteracting the torque provided by the magnetic torque motor.

DETAILED DESCRIPTION OF EXEMPLARY EMBODIMENTS

Figure 1:
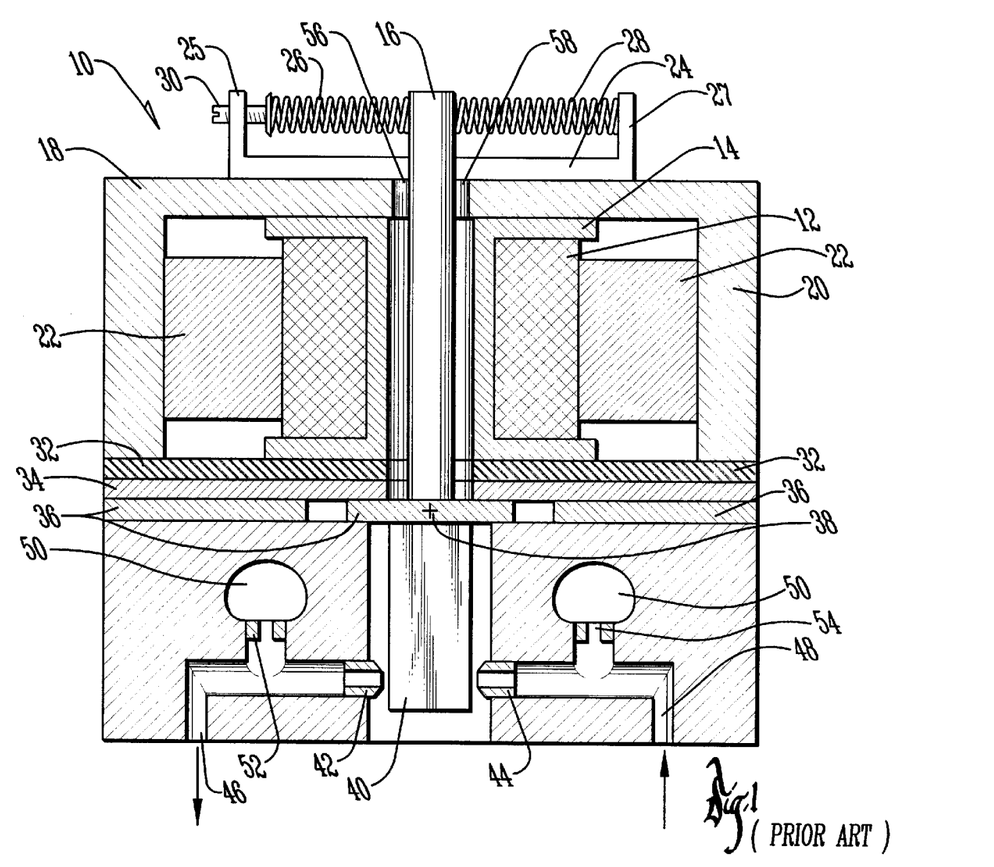
FIG. 1 is a cross-sectional view of a prior art pilot stage which uses an armature and a separate flapper.

FIG. 1 shows a cross-sectional view of a prior art pilot stage 10. Other valves exist which have different styles of air gaps and placement of magnets. Some valves have four variable gaps rather than the two variable, two fixed gap-design of this prior-art description. Pilot stage 10 includes a coil 12 wound around a bobbin 14. The coil 12 is part of a magnetic torque motor. An armature 16 extends through the coil 12. Permanent magnet 22 extends from pole piece 18 to pole piece 20 in back of coil 12. Another permanent magnet is usually placed parallel to magnet 22 in front of coil 12.

A spring holder plate 24 having flanges 25, 27 is attached to the pole pieces 18, 20. Spring holder plate 24 supports null adjustment springs 26, 28 which are connected between the flanges 25, 27 and the armature 16. Armature 16 has recesses for receiving the ends of the springs 26, 28. The other end of spring 28 is attached to a stub extending from flange 27. The other end of spring 26 attaches to adjustment screw 30.

Pole pieces 18, 20 and coil 12 are supported by a non-magnetic spacer plate 32. The non-magnetic spacer plate 32 rests on top of a magnetic plate 34. Magnetic plate 34 rests on top of torsion pivot plate 36. Other magnetic circuits exist which have 4 variable gaps rather than 2; these circuits do not require the non-magnetic and magnetic plates (which are required of the 2 air-gap circuit).

Pivot plate 36 has a torsion bar pivot 38 (or optional torsion tube). Torsion bar pivot 38 provides a pivot point for armature 16 and flapper 40. Armature 16 and flapper 40 are attached to torsion bar pivot 36. Armature 16 and flapper 40 together perform the flapper function of the pilot stage valve.

Flapper 40 extends between nozzles 42, 44 for controlling the pressure therein. Output port 46 provides the pressure within nozzle 42 as an output pressure. An output port 48 provides the pressure within nozzle 44 as an output pressure. Pressure is supplied to nozzles 42 and 44 from pressure supply 50 ($P_s$) through power orifices 52 and 54, respectively. Output ports 46 and 48 together provide the output differential pressure from the pilot stage.

The coil 12 is connectable to an electrical energy source. When current flows through coil 12 a torque is exerted on armature 16 at one of the air gaps 56, 58. The nozzle size of the nozzles 42, 44 is selected so that the torque exerted on flapper 40 by the fluid exiting nozzles 42, 44 is capable of balancing the maximum torque exerted on armature 16 by the magnetic torque motor. That is, the size of the nozzles 42, 44 is chosen so that the pressure across output ports 46, 48 applies a feedback torque to flapper 40 so that this torque balances the torque on armature 16 supplied by the magnetic torque motor. The maximum torque can include a large range of torque depending upon the desired performance of the pilot control valve.

Thus, as the torque applied to armature 16 changes, the position of flapper 40 will adjust to a point where the torque applied to the flapper 40 due to the force exerted on it by the fluid exiting nozzles 42, 44, which is a function of differential pressure across output lines 46, 48, balances the torque applied to armature 16 by the magnetic torque motor. Due to the feedback, the differential pressure across output ports 46, 48 is proportional to the input current supplied to coil 12 which generates the torque on armature 16.

The magnetic circuit's magnetic size, the air gaps' lengths and cross-sectional areas, and circuit operating flux/permeability levels determine how the electrical circuit matches the hydraulic circuit. The magnetic circuit results in a force output at the air gaps proportional to the difference of the squares of the magnetic flux at each air gap. The resulting torque (or force) output is split into two operating modes (with some negligible interdependence ignored) as:

Torque=$K_{tm} \cdot I + K_m \cdot \alpha$

Where: $K_{tm}$ is the torque motor gain in-lbs/ma
I is the input current
$K_m$ is the magnetic decentering stiffness (in-lbs/rad)of the magnet
$\alpha$ is the angular displacement of the flapper The $K_m$ term is mainly a result of the permanent magnet. The torsion pivot of FIG. 1 is required to cancel the effect of $K_m$. This canceling effect allows the input torque (from the torque motor) to be matched against the feedback differential pressure-created torque, unimpeded by other forces.

Figure 2:
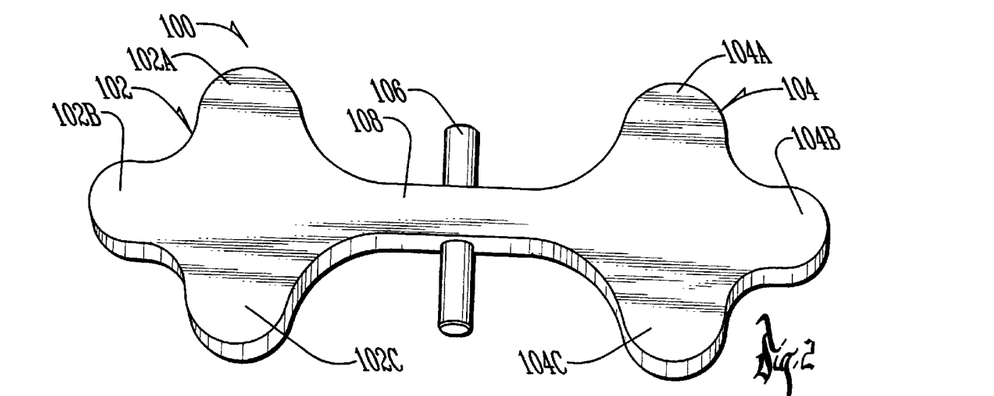
FIG. 2 is a perspective view of a flapper which can be utilized in the pilot stage of the present invention.

The present invention can include a pilot stage which performs the same function as the prior art pilot stage 10. However, the need for a flapper and a separate armature has been eliminated. FIG. 2 shows a perspective view of the top of a flapper 100 that can be utilized with the pilot stage of the present invention. Flapper 100 includes opposite ends 102, 104. Each end 102, 104 has three respective lobes 102A, 102B, 102C, and 104A, 104B, 104C, giving the ends 102, 104 a clover shape. Other configurations for the ends 102, 104 could be used depending on the characteristics of the magnetic circuit used in conjunction with the flapper.

Figure 2A:
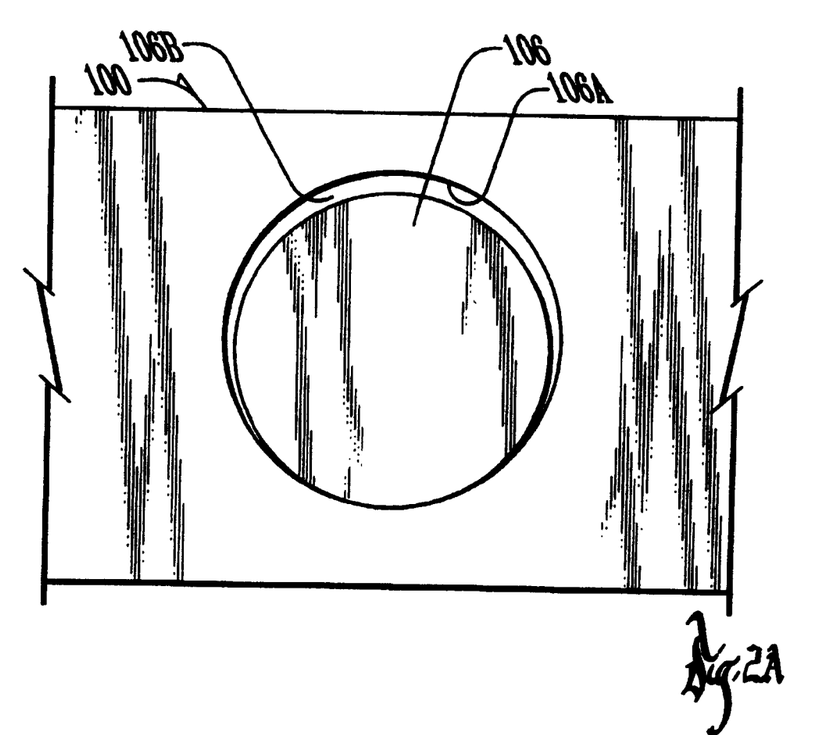
FIG. 2A is a partial large scale side elevational view of the center portion of the flapper of FIG. 2.

Flapper 100 has a pivot pin 106. The pivot pin extends horizontally through hole 106A in flapper 100 (FIG. 2A) with the ends of the pin 106 extending outwardly from the flapper (FIG. 2). The hole 106A has a diameter slightly greater than that of pin 106 so that there is a small clearance 106B between the hole 106A and the pin 106 (FIG. 2A) to create a free-floating pivot between the hole 106A and the pin 106. The pivot pin 106 is preferably located at, or substantially at, the center of mass of the flapper 100. The pin 106 is also preferably positioned with respect to the flapper 100 such that the flapper 100 is symmetrical about the center of pin 106 in all three directions. The flapper 100 has an elongated neck 108 (other shapes are possible) that connects the respective ends 102, 104 of the flapper. Flapper 100 is preferably made of a magnetic material. The flapper could be made of three parts, the main body as the physical means to translate the magnetic input forces to be summed against the output differential pressure and two individual magnetic plates to fulfill the magnetic circuit requirements, yet attached to the main body of the armature. The free-floating pivot allows the valve to be utilized without permanent magnets because there is effectively no pivot stiffness which has to be cancelled with the magnet (the gain $K_m$ is undesirable with no pivot stiffness).

Different shapes of armatures have been mentioned; in addition, a variety of pivot means are possible. The pin does not have to be restricted by a through-hole. The hole can be replaced by a slot with its opening from above (to gain easier assembly and other advantages). The bottom of this slot could be a radius or a flat surface or a mixture for ease of machining. The key dimension, in terms of critical features for proper operation, is the dimension between the bottom of this flat (or radius) with respect to the bottom surface of the armature (which, with the pin size and vertical space between the nozzles and pin-holding height, sets the nozzle-flapper gap).

The pin itself can be oriented from above the armature (perpendicular to its position in the sketches) if (1) the pin has a spherical end (such as a dowel pin) and (2) the armature has a hole (from above) with a spherical bottom (as machined from an end-mill with a radius). Providing there is a small clearance 106B between the hole 106A and the pin 106, the radius-to-radius contact becomes a good pivot. The pin could have flat-ends if a steel ball was placed between the pin and the armature.

Figure 3:
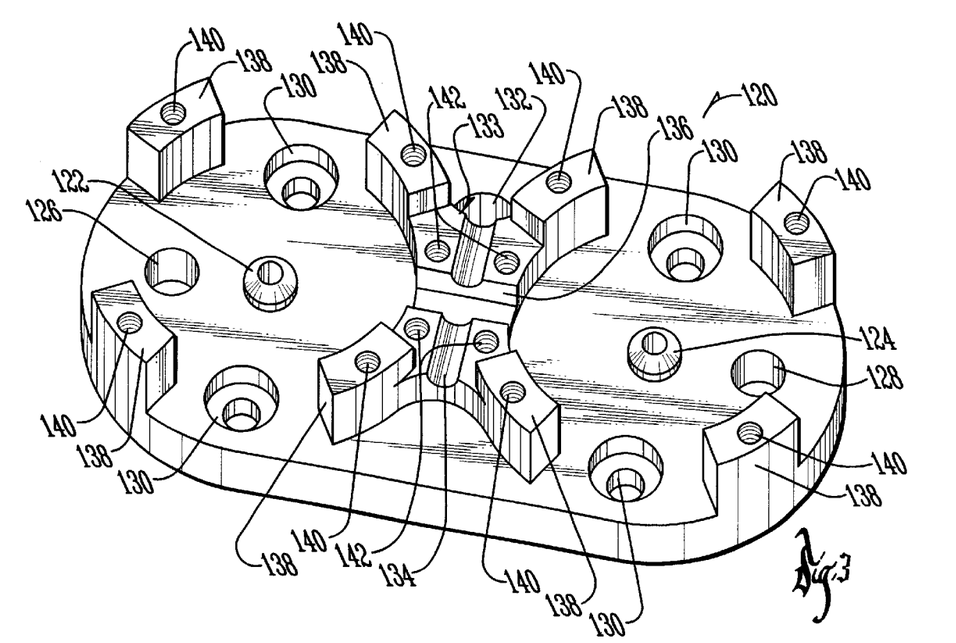
FIG. 3 is a perspective view showing the top of a nozzle plate which can be utilized in the pilot stage of the present invention.

FIG. 3 shows a perspective view of the top of a nozzle plate 120 that can be utilized with the pilot stage of the present invention. Nozzle plate 120 has nozzles 122, 124 machined into the plate 120. Rather than having the nozzles 122, 124 machined into a plate 120, nozzles could simply extend through the plate 120.

Nozzle plate 120 also has holes 126, 128 that allow for trim springs (not shown and not always required) to extend through the nozzle plate 120 and attach to the ends 102, 104 of the flapper 100 (FIG. 2). Recessed holes 130 are provided to allow nozzle plate 120 to be bolted down to another plate or housing. Opening 132 is provided to allow for return oil flow from the nozzles 122, 124.

Nozzle plate 120 also includes a center assembly 133. Center assembly 133 has a groove 134 to receive the pivot pin 106 of the flapper. Center groove 134 is made symmetrical with respect to nozzles 122 and 124, resulting in stable null characteristics and good symmetry (in terms of valve operating conditions). Center assembly 133 also has a notch 136 where the neck 108 of the flapper fits into the center assembly 133. Thus, flapper 100 rests within center assembly 133 when the flapper 100 is coupled to the nozzle plate 120. Threaded holes 142 allow a restraining member (not pictured) to be placed on top of the flapper 100 after the flapper has been coupled to the nozzle plate 120. The restraining member would restrict linear up and down movement of the flapper but should not restrict pivotal motion. It should be noted that flapper 100 is free to pivot about pin 106 to allow for movement when a magnetic force or torque is applied to the flapper 100.

Nozzle plate 120 also includes shoulders 138 having threaded holes 140. This shoulder height, in combination with the nozzle height, center groove height, and armature thickness, provides the proper air-gap distance between the armature and the pole-piece. The threaded holes 140 allow for attachment of the pole pieces. The pole-pieces could be physically one piece containing 2 coils, each having adequate magnetic material around each coil, to fit the circuit requirements. By combining the pole-pieces and coils into one assembly, it can become a top (hydraulic-sealed) cover for the pilot valve with a wiring connector positioned above.

Figure 4:
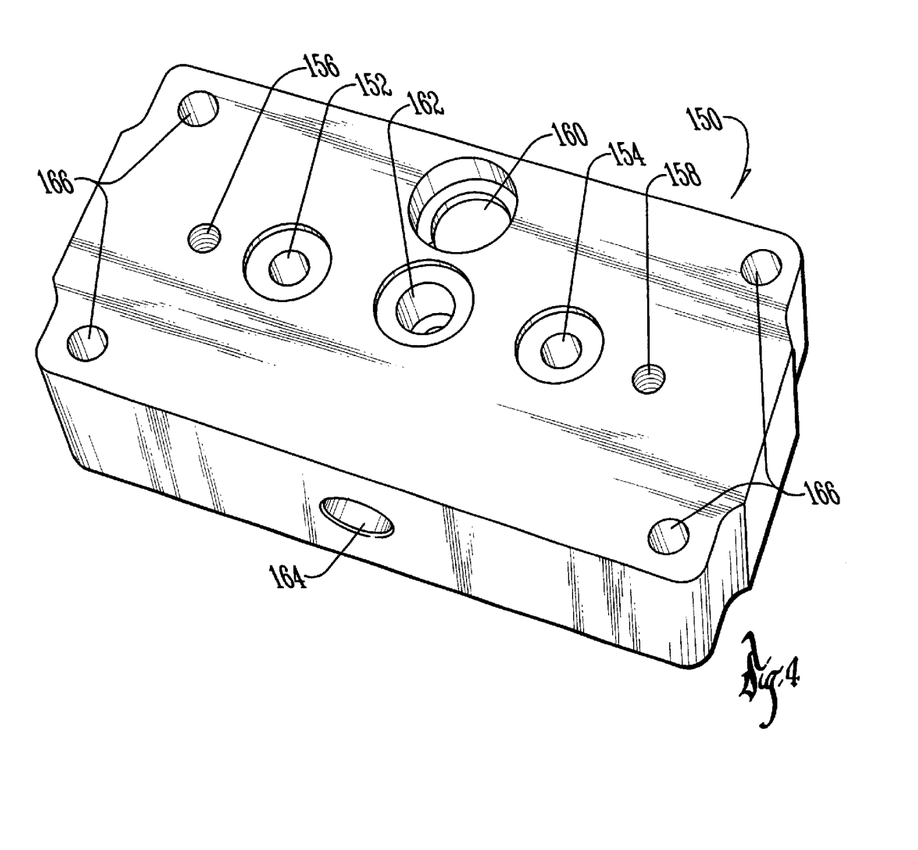
FIG. 4 is a perspective view showing the bottom of a base plate which can be utilized in the pilot stage of the present invention.

FIG. 4 shows a perspective view of the bottom side of a base plate 150 which can be utilized with the pilot stage of the present invention. In operation, the top side of base plate 150 would be coupled to the bottom of nozzle plate 120. Base plate 150 has holes 152, 154 located at the bottom of the base plate. Holes 152, 154 are continuous through the base plate 150. These holes 152, 154 would be plugged at the bottom of the base plate 150 when the pilot stage was in operation.

Base plate 150 has threaded holes 156, 158. Trim screws (not pictured) are inserted into the holes 156, 158. The threaded holes 156, 158 are continuous through the base plate 150. The trim screws extend through the holes 156, 158 and can be connected to springs on the top side of the base plate 150. As is understood in the art, the trim screws are used to adjust neutral between the magnetic and hydraulic stages.

Base plate 150 has a recessed hole 160. The recessed hole 160 is a supply port which supplies oil to the pilot stage. Typically, a screen or filter would be placed at this location to minimize any potential contamination concerns prior to the power orifices. In operation, supply port 160 is coupled to an oil supply line. Supply port 160 branches out inside the base plate 150 to holes 152, 154. Power orifices are located internally in the base plate 150 in the branches between the supply port 160 and the holes 152, 154. Base plate 150 also includes a return hole 162. Return hole 162 allows for return oil flow.

Base plate 150 also includes an access port 164. The access port 164 allows for machining of the internal lines that connect supply port 160 to holes 152, 154. Access port 164 does not serve any function within the pilot stage itself.

Base plate 150 includes four perimeter holes 166. These holes 166 are continuous through the base plate. These holes allow the base plate 150 to be bolted to another housing.

Figure 5:
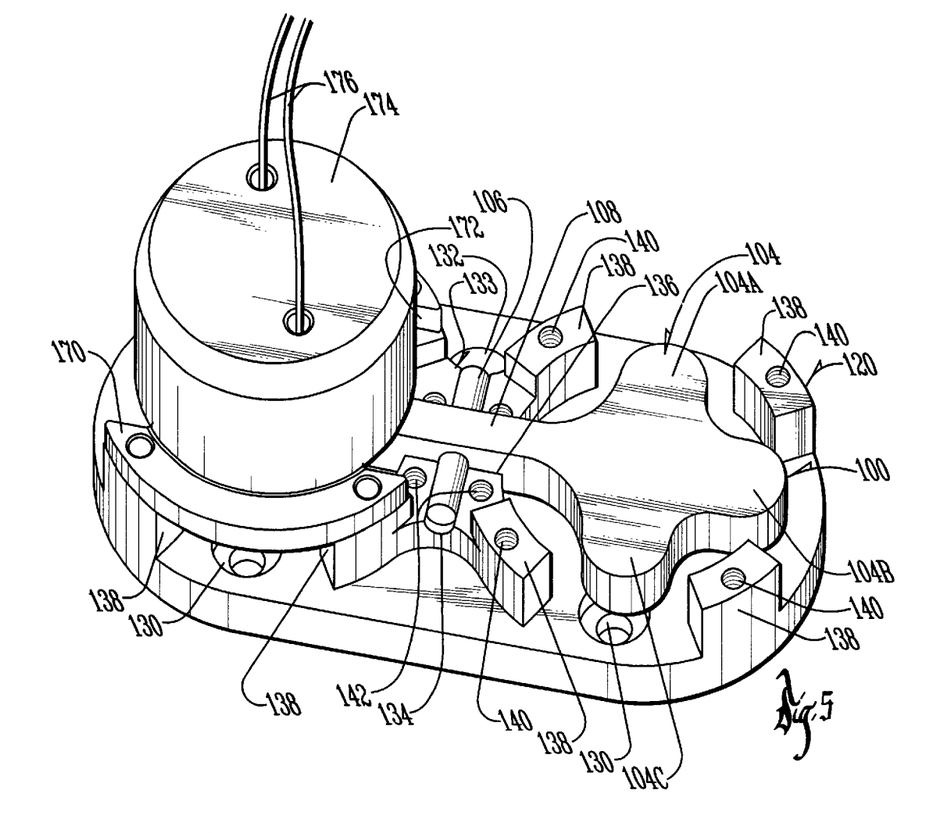
FIG. 5 is a perspective view showing the flapper and nozzle plate in an assembled relationship.

FIG. 5 shows a perspective view of the flapper 100 and nozzle plate 120 in an assembled relation. Also shown are pole piece legs 170, 172 (of pole-piece 174) attached to shoulders 138 through threaded holes 140. In addition, a pole-piece 174 containing a coil wound on a bobbin is positioned next to one end 102 of the flapper 100. The pole-piece 174 is made of a magnetic material. Wires 176 allow the coil to connect to an electrical energy source. A second coil and pole-piece assembly could be placed above the other end 104 of the flapper 100. In addition, a restraining member could be attached to holes threaded holes 142 to retain the pin 106. The assembly shown in FIG. 5 may be attached to base plate 150 or a different fluid supply source.

It will be apparent to those skilled in the art that nozzles 122, 124 and center assembly 133 do not have to be formed from a separate nozzle plate 120. However, forming the nozzles 122, 124 and the center assembly 133 on a single nozzle plate 120 makes it easier to maintain symmetry between the center assembly 133 and the nozzles 122, 124 (as well as the critical heights of these features).

An input current to the coil creates a magnetic force concentrated at the air gaps between the sides 102A and 102C of the flapper 100 and the pole pieces 170, 172 and the center air gap created between the pole-piece center post and the central section of the armature between these air gap locations. This force causes the flapper 100 to pivot about pivot pin 106.

It should be noted that in addition to the clover shaped ends 102, 104 (FIG. 2), the invention also works well with a flapper 100 having an elongated "H" shape. In other words, portions 102B and 104B are substantially removed and the remaining end portions 102A, 102C, and 104A, 104C have a substantially rectangular shape. The right hand side magnetic circuit shown with arrows 175' is an "E" shaped magnetic circuit (path in the pole-piece becomes an "E"). It is shown perpendicular to its real orientation. It would utilize the clover-shaped armature or an "H" shaped armature which extends in this perpendicular plane. In order for the air gaps to be appropriate, material is removed from portions of the armature or pole-piece to obtain three distinct air gap locations. The pole-piece in FIG. 5 is shown with material removed from the pole-piece to form the "E" shaped magnetic circuit.

In addition, the invention also works well with a flapper 100 having a rectangular overall shape. In other words, portions 102A, 102C, 104A, and 104C are substantially removed and the remaining end portions 102B and 104B have a substantially rectangular shape. A variety of the magnetic circuits can be produced by shaping either the armature or the pole-piece (or both) to concentrate the magnetic circuit flux paths.

FIGS. 6–9 show cross-sectional views of various pilot stages and pilot stage valves according to the present invention. Similar drawing numbers are used to correlate the various components in FIGS. 2–5 with those in FIGS. 6–9.

Figure 6:
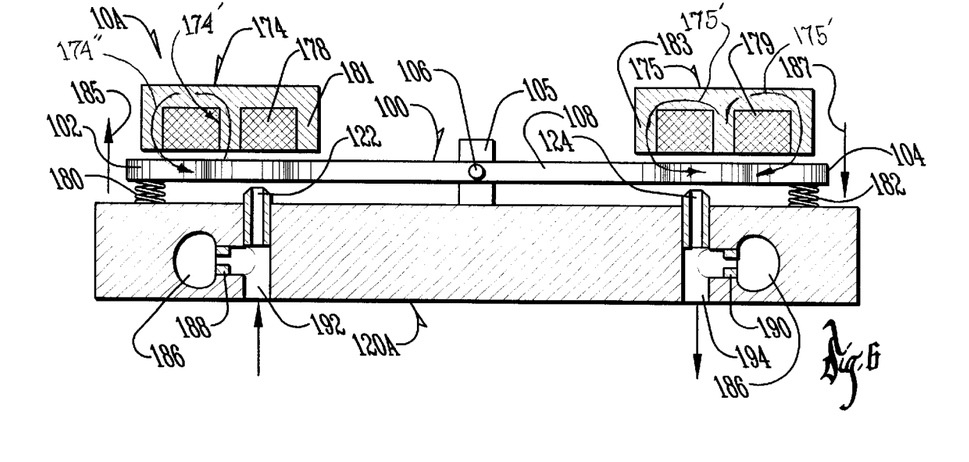
FIG. 6 is a cross-sectional view of an embodiment of an electro-hydraulic pilot stage according to the present invention.

The numeral 174' of FIG. 6 is the center post of the pole-piece. The energized coil provides the circuit flux beginning at this center post in a U-shape through part of the pole-piece through the air gap at the armature 102, thence through the armature, and then back to the center post through the second air gap directly below the center post. See the arrow 174' in FIG. 6. This circuit is part of the rectangular armature circuit. Material is removed from either the pole-piece or the armature in order for the air gaps to function as stated.

FIG. 6 shows a cross-sectional view of a pilot stage 10A according to the present invention. Pilot stage 10A includes a flapper 100. The pivot pin 106 rests in restraining member 105. Restraining member 105 is connected to the base plate 120A. Coils 178, 179 which are placed within magnetic pole-pieces 174, 175 are fixed above opposite ends 102, 104 of the flapper 100. Trim springs 180, 182 are connected to opposite ends 102, 104 of the flapper 100. Rather than using multiple pole-pieces 174, 175, the coils 178, 179 could be contained within a single pole-piece.

Nozzles 122, 124 extend from the base plate 120A. A pressure supply 186 is input into power orifices 188, 190. Output ports 192, 194 are coupled to nozzles 122, 124 respectively.

When a current is applied to coil 178, a magnetic force produces a torque at the air gaps between the armature 100 and the pole-piece 170 and the center shaft. The torque causes armature 100 to move in the direction indicated by arrow 185. The other end 104 moves in the direction indicated by arrow 187, as the flapper 100 pivots about pivot pin 106. This movement in the flapper 100 creates a pressure differential between the output of the nozzle 122, 124. The pressure of nozzle 124 increases in opposition to the movement of the flapper 100 (and the pressure of nozzle 122 decreases) to create a differential pressure between nozzles 122 and 124 proportional to the input current. Of course, current could be applied to the other coil 179 to pivot the flapper 100 in the opposite direction.

The centers of the nozzles 122, 124 are parallel to one another, and the tops of the nozzles 122, 124 are co-planar in a horizontal plane. In a neutral (or null) position, the distance between end 102 and nozzle 122 is equal to the distance between end 104 and nozzle 124. In a similar manner, in a neutral position, the distance between end 102 and pole piece 174 is equal to the distance between end 104 and pole piece 175. Other configurations could be used, depending on the desired characteristics of pilot stage 10A.

Figure 7:
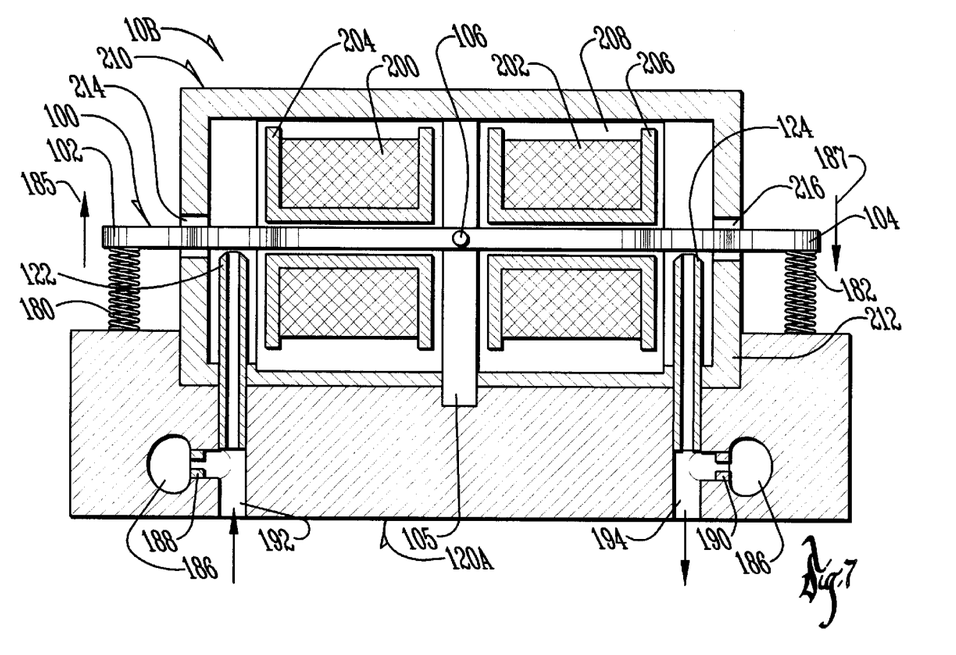
FIG. 7 is a cross-sectional view of a second embodiment of an electro-hydraulic pilot stage according to the present invention.

FIG. 7 shows a cross-sectional view of a second embodiment of a pilot stage 10B according to the present invention. Pilot stage 10B has coils 200, 202 wound around bobbins 204, 206. A permanent magnet 208 extends behind the coils 200, 202. An additional magnet may be placed in front of the coils. Flapper 100 extends through the coils 200, 202.

Pole pieces 210, 212 rest above and below the flapper 100. There are air gaps 214, 216 between the top of ends 102, 104 of the flapper 100 and pole pieces 210. There are also air gaps (not numbered) between the bottom of the ends 102, 104 and pole piece 212. When an input current is supplied to coil 200, a magnetic force is exerted which is concentrated at air gap 214 and its symmetric air gap below the armature and gap 216. In response to the magnetic force, the end 102 of the flapper moves in the direction indicated by arrow 185. The other end 104 of the flapper 100 moves in a direction indicated by arrow 187. The flow direction of oil within the pilot stage 10B is indicated by the arrows at the bottom of the base plate 120A. This pilot stage, since it employs the usage of a magnet, will have a decentering stiffness which must be counteracted by means of mechanical stiffness. Since the pivot is free-floating (no centering stiffness), the trim springs must be utilized to cancel the magnet decentering stiffness of the magnetic circuit or the air-gap is increased to minimize this effect. This pilot stage can be used as either a differential pressure pilot stage or as a pilot stage for other functions providing it is properly matched to secondary stages with the appropriate feedback signals (common in the industry).

Figure 8:
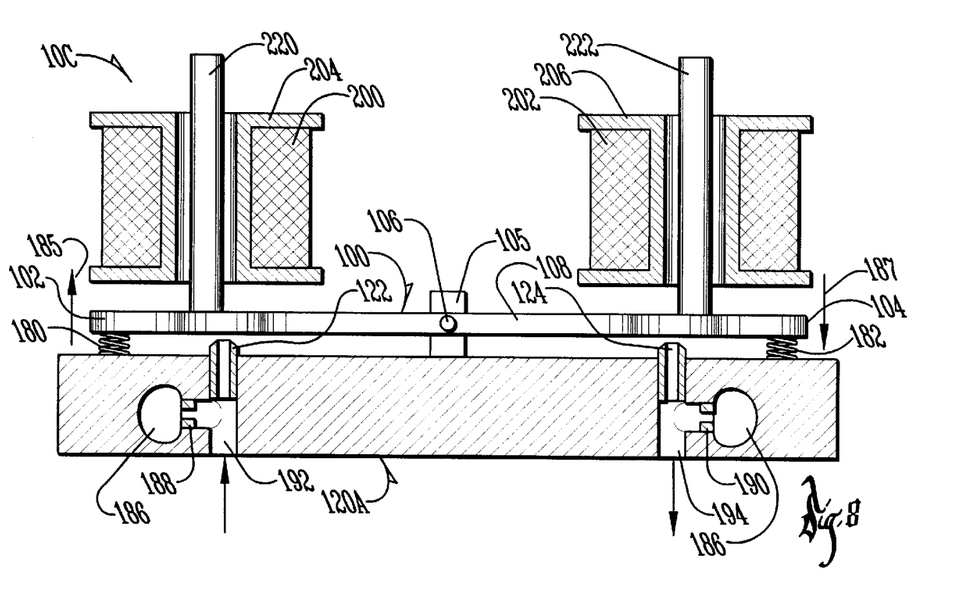
FIG. 8 is a cross-sectional view of a third embodiment of an electro-hydraulic pilot stage according to the present invention.

FIG. 8 is a cross-sectional view of a third embodiment of a pilot stage 10C according to the present invention. Armatures 220, 222 are attached to the flapper 100. The armatures 220, 222 extend through the middle of the coils 202, 204, respectively. The armature in this circuit can either be attached or unattached with the flapper. If the armatures are attached and when an input current is supplied to coil 200, a magnetic force pulls on armature 220 causing end 102 to move in the direction indicated by arrow 185. The other end 103 moves in the direction indicated by arrow 187. Under this condition of armatures attached to the flapper, an input current of opposite polarity will push the flapper reversing both the direction of the flapper and resulting output flow and differential pressure. If, however, the armatures are not attached to the flapper, the input current to a given coil can only push on the flapper to produce the required differential pressure output. Pole-pieces can be placed near the top of the armature and the sides of the armature to increase the force level of the magnetic circuit.

Figure 9:
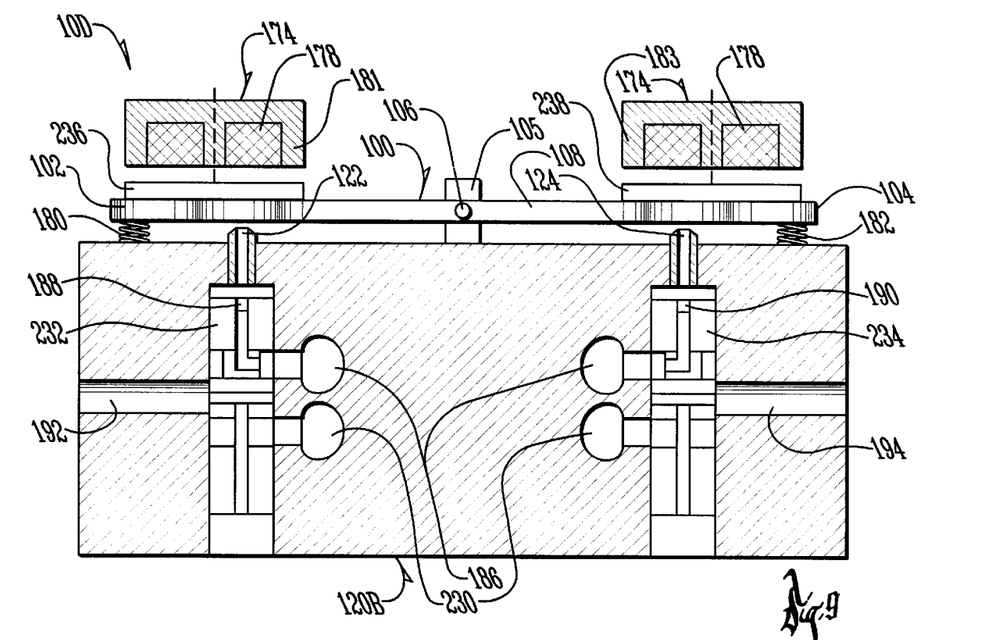
FIG. 9 is a cross-sectional view showing a slight variation of the pilot stage of FIG. 6 connected to three-land spools.

FIG. 9 shows a cross-sectional view of a combination 10D of a pilot stage connected to conventional 3-land spools 232, 234 contained within a housing 120B. The spools are in fluid communication with both a source of fluid under pressure 186 and with a return source 230 which is at lower pressure. Rather than being made out of a magnetic material, the flapper 100 has pole pieces 236, 238 attached to its ends 102, 104. As is understood in the art, the three land spool amplifies the flow of the pilot stage at the same differential pressure that is created between the nozzles 122, 124 when the flapper 100 is moved closer to one of the nozzles 122, 124. Of course, a 2-land spool could be used to perform the same function as the 3-land spool.

From the foregoing, it can be seen that the invention possesses at least all of the stated objectives.

I claim:

1. A pilot stage, comprising:

first and second nozzles that are connectable to a fluid supply;

a flapper having a free floating pivot and first and second ends, the ends being in fluid communication with the nozzles; and a magnetic torque motor without a permanent magnet having a first coil that is connectable to an electrical energy source, the first coil being magnetically coupled to the first end of the flapper, wherein the flapper will pivot in response to an input current to the first coil causing one end of the flapper to move closer to one of the nozzles, the free floating pivot comprising a pivot pin extending through a hole in the flapper with a small clearance existing between the hole and the pin.

2. The pilot stage of claim 1 further comprising a second coil magnetically coupled to the second end of the flapper.

3. The pilot stage of claim 1 further comprising a spring attached to each end of the flapper.

4. The pilot stage of claim 1 further comprising a nozzle plate, wherein the nozzles are formed from the plate, and a center assembly attached to nozzle plate wherein the flapper rests within the center assembly.

5. The pilot stage of claim 1 wherein the ends of the flapper are substantially clover shaped.

6. The pilot stage of claim 1 wherein the pivot pin rests within a restraining member which restricts lateral movement of the flapper.

7. The pilot stage of claim 6 further comprising a second coil magnetically coupled to the second end of the flapper.

8. A method of creating a pressure differential between first and second nozzles coupled to a source of fluid, comprising, placing a flapper having a free floating pivot and first and second ends in fluid communication with the first and second nozzles;

utilizing a magnetic torque motor to generate a magnetic torque to pivot the flapper whereby the first end of the flapper moves closer to the first nozzle and the second end of the flapper moves away from the second nozzle, creating a pressure differential between the nozzles, the free floating pivot comprising a pivot pin extending through a hole in the flapper with a small clearance existing between the hole and the pin.

9. The method of claim 8 wherein the magnetic torque motor has a magnetic circuit that is sized to maximize a torque motor gain while minimizing a torque-motor decentering stiffness without utilizing a permanent magnet.

10. A pilot stage which does not require a separate armature, comprising:

first and second nozzles;

a magnetic torque motor having a first coil, the first coil connectable to a source of electrical energy; and a flapper having first and second ends and a free floating pivot, the pivot located substantially at a center of mass of the flapper, the ends being in fluid communication with the nozzles, the first end of the flapper being magnetically coupled to the first coil whereby an input current to the coil produces a magnetic torque that causes the flapper to pivot, thereby moving one of the ends of the flapper closer to one of the nozzles to create a pressure differential, the free floating pivot comprising a pivot pin extending through a hole in the flapper with a small clearance existing between the hole and the pin.

11. The pilot stage of claim 10 further comprising a second coil magnetically coupled to the second end of the flapper.

12. A pilot stage for controlling pressure comprising, a housing for protecting the pilot stage;

a first inlet capable of connection to a fluid supply;

a first nozzle fluidly connected to the first inlet for receiving fluid from the fluid supply;

a base plate attached to the housing and the first nozzle; and a pivotally mounted flapper operatively connected to the base plate and having a first end proximate the first nozzle;

the flapper having a free floating pivot comprising a pivot pin extending through a hole in the flapper with a small clearance existing between the hole and the pin.

13. The pilot stage of claim 12 further comprising a magnetic torque motor without permanent magnet having a first coil that is connectable to an electrical energy source, the first coil being magnetically coupled to the first end of the flapper, wherein the flapper will pivot in response to an input current to the first coil causing the first end of the flapper to move relative to the nozzle.

14. The pilot stage of claim 12 further comprising a second inlet capable of connection to the fluid supply; a second nozzle fluidly connected to the second inlet for receiving fluid from the fluid supply; and the second nozzle attached to the base plate, the pivotally mounted flapper having a second end proximate the second nozzle.

\* \* \* \* \*